March 23, 1937. H. C. LAGERBLADE 2,074,986
METHOD OF MAKING WELDED SHEET METAL GOLF
SHAFTS AND WELDING SHIM THEREFOR
Filed Oct. 8, 1932
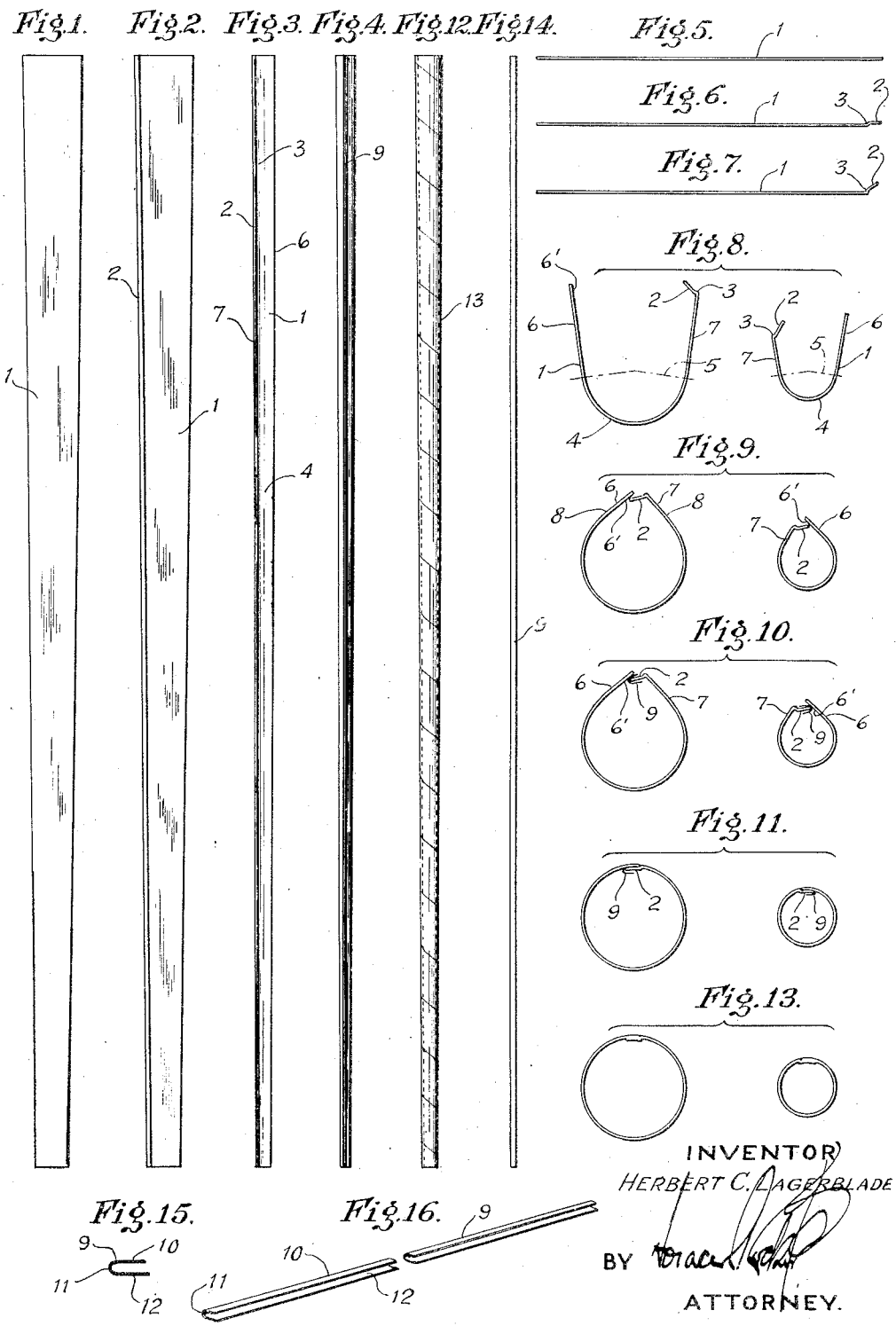
INVENTOR
HERBERT C. LAGERBLADE
BY
ATTORNEY.

Patented Mar. 23, 1937

2,074,986

UNITED STATES PATENT OFFICE 2,074,986

METHOD OF MAKING WELDED SHEET METAL GOLF SHAFTS AND WELDING SHIM THEREFOR

Herbert C. Lagerblade, Bristol, Conn., assignor to The Horton Manufacturing Company, a corporation of Connecticut Application October 8, 1932, Serial No. 636,850

20 Claims. (Cl. 29—156)

My invention relates to welded sheet metal golf shafts and methods of making the same.

It has heretofore been proposed to produce such shafts having a steel and copper weld in the form of a longitudinal welded section inside the periphery of the shaft, but such welded sections have been quite heavy due to the presence of a considerable amount of added material therein and the necessity for using an additional steel welding strip in addition to the copper. Further, due to the use of the additional steel strip and the necessity for separately making and inserting the same and the copper, or separately making and then combining the steel and copper strip before insertion, and, after welding, also grinding off the excess steel, etc., these shafts have been rather expensive.

As regards methods of manufacture, these shafts have heretofore been made by forming a round blank with a slot therein and either drawing into this slot a steel strip of the type described and claimed in the Emmet and Thorpe Patent 1,550,153, and subsequently inserting copper wires preparatory to welding, or, in an improved form, drawing in, in one operation, a previously made unit in the form of a combined steel and copper strip of the type described and claimed in my prior Patent 1,783,802. In either case, the shaft has also thereafter been wrapped in asbestos and welded in a furnace in a hydrogen atmosphere, and subsequently ground to remove the excess steel projecting from the outer surface of the same. Thus, these methods have required a considerable number of operations, some of which are expensive and troublesome, while also requiring a considerable amount of expensive material, some of which is wasted, while the remainder creates objectionable weight.

My invention has among its objects to provide an improved golf shaft, and, more particularly, an improved shaft of welded sheet metal type which, while as strong or stronger than other shafts of this type, has less weight in the weld and is therefore lighter than such shafts heretofore produced, while also being better balanced and somewhat more resilient, at the same time that it is substantially less expensive to manufacture than previous shafts of this type. Further objects of my invention are to provide an improved method of making such shafts, and one which is adapted to produce the improved shaft mentioned above, while at the same time eliminating various steps heretofore considered necessary in the manufacture of such welded shafts, and also reducing the amount, weight and expense of the material used to effect the weld, all in such manner as substantially to facilitate the manufacture of such welded shafts while substantially reducing the cost of the same and producing an improved shaft. Still further objects are to provide an improved welding strip and improved blanks adapted to be formed in the various steps of the improved method and used with my improved strip in an improved manner. These and other objects and advantages of my improvement will, however, hereinafter more fully appear.

In the accompanying drawing, I have shown for purposes of illustration, one embodiment of my improved shaft, and one embodiment of my improved method for producing the same.

In the drawing,—

Figure 1 is a plan view of the first form of blank;

Fig. 2 is a plan view of the same after the first edge bending operation;

Fig. 3 is a plan view showing the blank after the first forming operation;

Fig. 4 is a plan view of the blank after the forming and drawing in operations;

Fig. 5 is an enlarged end elevation of the blank shown in Figure 1;

Fig. 6 is an enlarged end elevation of the blank shown in Figure 2;

Fig. 7 is an enlarged end elevation of the blank after the second edge turning operation;

Fig. 8 is a combined view showing enlarged opposite end views of the larger and smaller ends of the shaft after the first forming operation;

Fig. 9 is a corresponding view showing those ends after the second forming operation;

Fig. 10 is a similar combined view showing my improved welding strip drawn into the partially closed blank shown in Figure 9;

Figure 11 is a similar combined view showing the closed blank ready for wrapping with asbestos;

Fig. 12 is a plan view of the blank wrapped with asbestos ready for the welding operation;

Fig. 13 is a view similar to Figures 8 to 11 showing the opposite ends of the finished shaft;

Fig. 14 is a plan view of my improved welding strip which is drawn into the blank prior to the wrapping and welding operations;

Fig. 15 is an enlarged end view in cross section of the strip shown in Figures 14 and 16, and Fig. 16 is an enlarged perspective view of this strip.

Referring first to my improved method, it will be noted that I first form a flat tapered blank 1, shown in Figures 1 and 5, which is of any desired length and formed of thin sheet metal, such as steel, although the thickness is subject to variation, as in previous methods. I next subject this blank 1 to one or more edge forming operations adapted to turn up a narrow strip 2 along one edge of the same, as shown in Figure 7, with the edge 2 disposed at an angle of approximately 45 degrees to the plane of the blank 1. Herein, as preferably, this edge 2 is also connected to the blank 1 by a suitable connecting portion 3, likewise bent up from the body of the blank, but at a sharper angle, herein somewhat less than 90 degrees. In my improved method, the edge 2 is bent up in two operations in the nature of press operations, one acting to form the edge 2 and connecting portion 3 in the form shown in Figures 2 and 6, i. e. with the edge 2 disposed parallel to the blank 1, as illustrated therein, and the other bending the edge 2 from the position shown in Figure 6 to the position shown in Figure 7. Here it will be noted that the blank has like, or smooth-surfaced, edge portions free from registering projections and the like which, as will hereinafter appear, overlap in the finished shaft and are welded directly together without the usual interposed steel strip.

Upon the completion of this edge forming operation, and with the blank 1 in the form shown in Figure 7, the same is then subjected to the forming operations. The first of these is an operation adapted to U out the blank and shape it into the form shown in Figure 8. It is preferably performed in a usual combined press and roll which is adapted to press down the center of the flat blank and, while the shaft is fed along, press in the sides and thus transform the blank of Figure 7 into the general U shape illustrated in Figure 8. Referring more particularly to the latter figure, it will be noted that the blank 1 is provided with a rounded under portion 4, forming substantially half of the body, which is thus formed complete in this operation. Above a transverse middle line 5, the blank is in this stage provided with upstanding integral tapered sides 6 and 7. Of these, the side 7, which is the side provided with the edge portion 2, 3, heretofore described, is bent up through an angle of slightly less than 90 degrees, while the edge 2 extends inward and angularly upward from the upper edge thereof, as illustrated. The side 6, on the other hand, is bent upward similarly to the body of the side 7 and disposed in an angle corresponding to the angle of the side 7 and equally distant from an axial vertical plane. It will also be noted that the side 6 is of gradually increasing greater height than the side 7 toward the smaller end of the blank. Thus it will be observed that the lower half of the shaft is formed complete in this first forming operation, while the upper half is left open with the sides 6 and 7 extending as described, wherein they are ready for the second forming operation.

This operation, the results of which are shown in Figure 9, is preferably a press operation during which dies press the sides 6 and 7 inward and the body is further formed or rounded. Herein, the forming or rounding is carried higher through unequal distances so that it extends through substantially two-thirds of the length of the sides 6 and 7 to points 8. Of these, it will also be noted that that on the side 6 is slightly higher than that on the side 7. Above its point 8 it will also be noted that the upper portion of the side 7, which is now the under tapered portion, is bent toward a vertical plane passing through the axis of the blank so that the upper end of the body portion 7 now has its upper end nearer that line than its lower end. Further, the edge 2 is bent slightly downward and has its extremity extending slightly beyond the line in question. The upper extremity of the side 6 is also similarly bent toward the line in question and so that the inner surface of the same at a point near the edge thereof, engages, or substantially engages, the extremity of the edge 2. Thus, in this operation, the rounding process is carried further, at the same time that the sides are so disposed as to be ready to receive the new welding strip used in the welding operation.

This strip, generally indicated at 9, is preferably in the form of a separately formed shim of copper or like welding material and is quite thin. The thickness thereof may be varied and, under varying conditions, slightly thicker or thinner shims used, but I prefer to use shims having a thickness of .003 and to keep the shims within the limits .001 and .005. In this form, the copper, while continuous and adapted to be readily inserted between the edge 2 and the edge of the side 6, hereinafter referred to as 6', is found to be very effective in the welding operation, since it makes it possible to use a minimum of copper and thus obtain a strong metal to metal weld with practically no excess metal in the weld to increase the weight thereof or to present problems after the weld has been made. In fact, the copper of the shim combines with the proximate steel portions of the shaft to form a very strong homogeneous joint which is even stronger than the steel comprising the shaft and is believed to form a copper-steel alloy. While the shim may assume various forms, the same in a preferred form includes a portion 10 adapted to be disposed when the parts 6' and 2 are slightly spread, between the edge 6' and the edge 2 and engage both of the latter edges while also being wider than the edge 2 with the excess width within the latter edge and adjacent the same. In a preferred construction, this portion 10 is provided with a curved adjacent portion 11 which extends downward along the extremity of the edge 2 and also with an underlying connected portion 12, corresponding to the portion 10, but which is slightly wider than the latter, and which is provided to assist in locating the portion 10 as hereinafter described. Thus it will be noted that the strip 9 provides a welding shim wider than the overlap which is adapted to underlie the portion of the side 6 and overlie the depressed portion 2 on the side 7 while having excess width within the blank throughout the length of the latter and adjacent the edge 2, and a gradually increasing amount of excess width outside the edge 2 toward the smaller end of the tapered blank, all in such manner as to assure effective welding when the parts are brought together, as hereinafter described. Moreover, it will be noted that while without the portion 12, the strip may be inserted, if desired, from the side, the provision of the increased width included in the portion 12 increases the strength of the strip in such manner as to enable it to be very conveniently drawn in longitudinally of the shaft into the position shown in Figure 10, while still enabling a narrow strip, of, for example, a width of $\frac{1}{32}$ of an inch, to be used. Further, the shape of the strip illustrated, with the U-shaped portion formed by the parts 10 and 12 connected and spaced apart by the curved portion 11, is also such as to permit ready drawing in while causing the shim to be readily and effectually located or positioned relative to the edge 2 without danger of accidental displacement during handling or further forming of the shaft. Here attention is directed to the fact that the dimensions of the curved connecting portion 11 are sufficient to space the parts 10 and 12 of the shim apart the required distance to permit the edge 2 to enter therebetween with its extremity in contact with the portion 11, thus permitting substantial overlap of the sheet metal edges at the seam without an excess of copper in the finished weld. Attention is also particularly directed to the fact that there is an uninterrupted metal to metal contact between the smooth imperforate edge portions of the sides 6 and 7 and the smooth imperforate shim throughout the length and width of the welded seam, while the disposition of the excess width, i. e. the width of the shim greater than the overlap, is such as to provide for an effective weld along both edges of the overlap and minimize the problem of excess metal on the outer surface of the shaft after welding.

With the strip 9 inserted between the engaging edge portions 6' and 2, and the parts in the position shown in Figure 10, the sides 6 and 7 are further closed or ironed to complete the rounding operation and further prepare the same for welding, as, for example, in a press with die means forcing the parts into the position illustrated in Figure 11 during which operation the edge portion 6' slides laterally over the shim. In this position, it will be observed that the smooth edge 6' of the side 6 is disposed over the like depressed portion 2 on the side 7 and that, by reason of the inherent resilience of the material of the tube and the set imparted during the pressing operation, the two smooth edges are constantly urged into engagement, while the edge 6' and the remainder of the body of the side 6 co-operate with the body of the side 7 to present a round tubular cross section since the two overlapping edge portions conform to one another and the periphery of the shaft, while the portion 6' forms a part of the periphery. This operation is greatly simplified by reason of the fact that the edges of the blank are entirely free from any interlocking elements requiring exact longitudinal registry of the edges during these pressing operations. Moreover, it will be noted that the portion 2, which then underlies the edge 6' and conforms thereto, has the shim portion 10 pressed tightly between it and the edge 6', while the portions 11 and 12 of the strip 9 engage the edge and under side of the edge portion 2, all in such manner as, while holding the strip 9 in position, to prepare the edges 6' and 2 for an effective union when the strip 9 is melted during the welding operation.

After the shaft has been thus prepared for welding, it is next spirally wrapped in a usual manner in a wet strip of asbestos 13, which, as usual, also holds the parts in their assembled relation throughout the welding operation. When so wrapped, the shaft is then heated, preferably in a hydrogen atmosphere. As a result, the copper in the strip 9 is melted in such manner as to cause the edges 6' and 2 to be effectually united, while the copper also flows in such manner as to fill any seams, and the holding edge 12, of course, is also melted away. After heating, the then dry asbestos wrapping 13 is stripped off. Then the shaft is heat treated, and, if necessary, straightened. Thereupon, the same is ready for a simple polishing off operation to remove any excess metal or dirt thereon to complete the manufacturing process, although, of course, thereafter, the same may be suitably coated or plated in any usual way to prevent rust or enhance its saleability, as desired.

As a result of my improvements, it will be noted that a lighter, better balanced and more resilient shaft is produced due to the exceedingly light welded section or joint. More particularly, it will be noted that this section or joint comprises only two thicknesses of the sheet metal in the body of the shaft, and a minimum of copper between these thicknesses, and that the overlapping edge portions are free from irregularities. In this connection note particularly that the overlapped like edge portions are smooth and free from perforations and interlocking projections. As a result, the weld therebetween is homogeneous throughout the length and width of the welded section and constitutes the sole connection between these like edge portions throughout the length of the shaft. It is found that a copper steel alloy weld formed with a thin copper shim, as above described, is stronger than the steel comprising the shaft body and, since the alloy weld provided between these overlapped smooth and imperforate edge portions is uninterrupted throughout the welded seam, an overlapped seam shaft of superior strength is provided, better capable of withstanding bending stresses without breaking at the welded joint. Moreover, it will be noted that the joint is quite narrow, while still obtaining an effective weld, and that it thereby further reduces the amount of material in the joint, and the consequent weight of the latter. Thus, as compared with the use of the steel strip taught by Emmet and Thorpe, wherein the steel strip extends down through the slot and has, in addition to the copper and the edges of the slot, two folded thicknesses of steel under one of said edges and one thickness of steel under the other, it is made possible substantially to reduce both the material used and the weight of the weld. In fact, the weight of the whole welded section in my improved construction is less than the weight of the Emmet and Thorpe strip or my prior strip. Further, it will be noted that there being no portion of the new strip extending above and overlying the outer surface of the shaft after welding as in both of the prior strips, my improvement eliminates any need for the additional grinding off operation required to remove that protruding portion of the strip after the welding operation. My improved strip is also much more economically produced than either of the prior strips, the same being not only more economical as regards material costs, but also as regards the cost of shaping the same for insertion. Thus, several forming operations required in making the Emmet and Thorpe strip and also my prior strip, are eliminated, as is also the delicate operation of joining the copper and steel strip in the latter construction. Thus, at the same time that an improved shaft is produced having an improved lighter welded section, better balance and slightly greater resiliency, it is also made possible not only to facilitate the manufacture of the shaft, but also to reduce the expense of manufacture very substantially, the saving running to several cents per shaft. In this connection it should be noted that in the final shaping operation, in which the shaft is shaped from the form shown in Figure 10 to that illustrated in Figure 11, due to the like smooth edge portions and the absence of interengaging members thereon, a lateral movement of the edge portions is made possible during which the edge portion 6' slides over portion 2, as distinguished from a vertical movement of the edge portions relative to each other required in some prior art constructions in which interlocking edge portions have been employed. This lateral movement permits the final forming step to be performed by a press operation, whereas the prior constructions above mentioned, in which a vertical approach of the edge portions was required, necessitated the use of a mandrel and further required such exactness of alignment of the interengaging edge portions that it was commercially impracticable. These and other advantages of my improvements will, however, be clearly apparent to those skilled in the art.

While I have in this application specifically described one embodiment which my improved shaft may assume in practice, and one method of making the same, it will be understood that these have been described herein for purposes of illustration, and that my invention may be modified and embodied in various other forms without departing from its spirit or the scope of the appended claims.

What I claim as new and desire to secure by Letters Patent is:—

1. The steps of making tubular articles which consist in, partially forming a blank having opposed edge portions, pressing said portions laterally in opposite directions to complete the forming operation while gripping a shim of welding material therebetween, and welding the same while said shim is gripped by said portions.

2. The steps of making tubular articles which consist in, partially forming a blank having opposed portions, inserting a shim of welding material therebetween, and pressing said portions in opposite directions laterally relative to one another while completing the forming operation and compressing said shim between said opposed portions.

3. The steps of making golf or other shafts which consist in, forming a shaft blank having overlapping portions, and drawing a shim of welding material into the blank longitudinally of the same and between said overlapping portions while said overlapping portions are in resilient engagement.

4. The steps of making golf or other shafts which consist in, forming a shaft blank having smooth normally mutually engaging angularly disposed overlapping portions, inserting a shim of welding material between said portions spacing one portion from the other, and pressing said portions while one slides laterally on the shim into parallel relation with said shim compressed therebetween.

5. The steps of making golf or other shafts which consist in, forming a shaft blank having smooth overlapping edge portions, inserting longitudinally between said portions while they are in resilient engagement a shim of welding material having hook means engaging the free edge of the lower portion, and welding said edge portions while said portions and hook means are pressed together.

6. The steps of making golf or other shafts which consist in, forming a shaft blank having overlapping engaging edge portions having resiliently engaging smooth surfaces, and springing said portions apart by longitudinally inserting a shim of welding material between said surfaces.

7. The steps of making golf or other shafts which consist in, forming a trough shaped body having relatively angularly disposed like edges above the same, inserting a welding shim between said angularly disposed edges, bringing said edges laterally into overlapping contacting relation with said shim compressed therebetween throughout the length of the blank by relative lateral movements in opposite directions while further forming the shaft, and welding said edges directly to each other while the two are pressed together.

8. The steps of making golf or other shafts which consist in, completely forming a shaft blank below like angularly disposed engaging edge portions, drawing a shim of welding material between said engaging edge portions, and pressing said portions into overlapping relation while moving the same laterally in opposite directions relative to one another to complete the forming operation.

9. The method of making tubular articles which consists in, forming a blank having a body of final cross section throughout a substantial portion of the periphery thereof spaced from the edges of said blank, inserting between said edges a shim gripped thereby, forming the remainder of said body while continuing to grip said shim, and welding said edges while gripping said shim.

10. The steps of making golf or other shafts which consist in, forming a blank having angularly disposed complementary depressed and overlying edges, inserting a welding shim between said overlying edges, and sliding said edges laterally in opposite directions past each other into overlapped closely adjacent relation while said shim therebetween abuts one edge.

11. The steps of making golf or other shafts which consist in, forming a shaft blank having overlapping angularly disposed smooth surfaced edge portions, inserting longitudinally therebetween and in abutting relation with the edge of the inner portion a shim of welding material engaging the smooth surfaces of both of said portions and wider than the overlapping portion and having excess width along the overlap within the blank, and completing the formation of the shaft by a lateral movement of said edge portions relative to each other while maintaining said shim in the aforesaid relation thereto.

12. The steps of making golf or other shafts which consist in, forming a flat tapered blank having like edge portions, troughing the blank while disposing said edge portions angularly above the trough and completing the formation of the shaft below said edge portions, inserting a welding strip between said edge portions, bringing said edge portions with said strip therebetween into overlapping relation by relative lateral movements in opposite directions while completing the formation of the shaft, and welding said edge portions.

13. The steps of forming golf or other shafts which consist in, partially forming a tapered shaft at its bottom while forming upstanding tapered sides above said body, one of gradually increasing greater height relative to the other toward the smaller end of the shaft, bringing said sides into overlapping relation at their edges by relative lateral movements in opposite directions while further forming the shaft, and welding said overlapping edges.

14. The steps of making golf or other shafts which consist in, partially forming a shaft having upstanding tapered sides, one of gradually increasing greater height relative to the other toward the smaller end of the shaft, bringing said sides into resiliently engaging overlapping relation at their edges while further forming the shaft, inserting a shim of welding material between said overlapping edges, pressing said edges laterally in opposite directions to complete the forming operation, and welding the same.

15. The steps of making golf or other shafts which consist in, forming a portion of the body of the blank to its finished shape while providing an unfinished portion including tapered sides, one of gradually increasing greater height relative to the other toward the smaller end of the shaft, and forming the unfinished portion of the body by bringing the edges laterally into overlapped engagement above the finished portion of the body while sliding one edge laterally relative to the other.

16. The steps of making a golf or other shaft which consist in, partially forming a substantially trough shaped body having upwardly extending tapered sides, one of gradually increasing greater height than the other toward the smaller end of said blank, bringing the edges of said sides into overlapping engagement while further forming said body, inserting a shim of welding material between said engaging edges, completing the forming operation by a lateral movement of said edges relative to each other while sliding one on said shim, and welding the edges together.

17. The steps of making a golf or other shaft which include, forming a tapered blank having tapered overlapping edges overlapping through different distances at opposite ends of the blank, and inserting between said edges a shim of welding material wider than the overlap with excess width thereof within the blank along the overlap at both ends of the blank and a gradually increasing excess width outside the overlap toward the smaller end of the blank.

18. A welding drawing-in shim for sheet metal golf shafts or the like having overlapped seams comprising a shim of copper of a thickness substantially within the limits of .001 and .005 of an inch and having reinforcing and guiding means formed on an edge thereof for enabling the same to be pulled longitudinally into welding position in the seam, said guiding means having a configuration permitting a substantial overlap of the sheet metal edges at the seam.

19. A welding drawing-in shim for sheet metal golf shafts or the like having overlapped seams comprising a shim of copper having longitudinally extending means formed thereof on one edge thereof for reinforcing the body of the same and positioning the same in welding position and spaced from the body of the shim at said edge to provide a configuration permitting a substantial overlap of the sheet metal edges at the seam.

20. A welding drawing-in shim for sheet metal golf shafts or the like having overlapped seams comprising a shim of copper of substantially U-shaped cross section including a back connecting portion and side portions spaced apart at said back portion and having one side portion thereof wider than the other and a configuration permitting a substantial overlap of the sheet metal edges at the seam.

HERBERT C. LAGERBLADE.